(12) United States Patent
Tsai

(10) Patent No.: US 6,664,660 B2
(45) Date of Patent: Dec. 16, 2003

(54) PARALLEL POWER SUPPLY SYSTEM WITH OVER-VOLTAGE PROTECTION CIRCUIT

(75) Inventor: Kuei-Hsiang Tsai, Jungli (TW)

(73) Assignee: Delta Electronics, Inc., Taoyuan (TW)

( * ) Notice: Subject to any disclaimer, the term of this patent is extended or adjusted under 35 U.S.C. 154(b) by 175 days.

(21) Appl. No.: 10/037,776

(22) Filed: Jan. 4, 2002

(65) Prior Publication Data

US 2003/0128487 A1 Jul. 10, 2003

(51) Int. Cl.[7] .............................. H02J 1/00; H02H 3/20; H02H 7/122
(52) U.S. Cl. .......................... 307/71; 307/82; 361/91.1; 363/56.11
(58) Field of Search .............................. 307/52, 60, 62, 307/69, 71, 82, 83, 85, 86; 361/18, 78, 86, 91.1; 363/21.01, 21.09, 21.17, 56.09, 56.11

(56) References Cited

U.S. PATENT DOCUMENTS

| | | | | |
|---|---|---|---|---|
| 4,754,161 A | * | 6/1988 | Fox ............................. | 307/87 |
| 5,319,536 A | * | 6/1994 | Malik .......................... | 363/65 |
| 5,506,456 A | * | 4/1996 | Yang ........................... | 307/81 |
| 5,821,641 A | * | 10/1998 | Demo et al. ................. | 307/125 |
| 5,834,925 A | * | 11/1998 | Chesavage .................. | 323/272 |

* cited by examiner

Primary Examiner—Matthew V. Nguyen
(74) Attorney, Agent, or Firm—Benesch, Friedlander, Coplan & Aronoff, LLP

(57) ABSTRACT

A parallel power supply system with an over-voltage protection circuit is provided. The parallel power supply system includes two power supplies which are paralleled for providing a stable DC output voltage, two isolated diode electrically, each of which is coupled between an output of each power supply and the DC output voltage for isolating outputs of the power supplies and the DC output voltage respectively, two voltage feedback controllers, each of which feeds back an output voltage of each power supply to control output voltages of power supplies at a predetermined value respectively, two resistors, and two bypass diodes used for forming a bypass connection which operates during the over-voltage outputting period.

7 Claims, 4 Drawing Sheets

PARALLEL POWER SUPPLY SYSTEM WITH OVER-VOLTAGE PROTECTION CIRCUIT

FIELD OF THE INVENTION

The present invention relates to a parallel power supply system for providing a stable output voltage, and especially to a parallel power supply system with an over-voltage protection circuit for providing a stable output voltage.

BACKGROUND OF THE INVENTION

FIG. 1 shows a parallel power supply system according to the prior art. Please refer to FIG. 1. A typical parallel power supply system for providing a stable DC output voltage includes a first power supply 11, a second power supply 12, a first isolated diode 21, a second isolated diode 22, a first low pass filter 31, a second low pass filter 32, a first voltage feedback controller 41, and a second voltage feedback controller 42. The first power supply 11 has a first output terminal for providing a first DC output voltage and a first ground terminal electrically connected to ground. The second power supply 12 has a second output terminal for providing a second DC output voltage and a second ground terminal electrically connected to ground. The first isolated diode 21 has an anode end electrically connected to the first output terminal of the first power supply 11. The second isolated diode 22 has an anode end electrically connected to the second output terminal of the second power supply 12, and a cathode end electrically connected to a cathode end of the first diode 21 for forming a node 5 which is an output $V_o$ of the parallel power supply system. The first voltage feedback controller 41 is electrically connected to the output $V_o$ for providing a first control signal to control the first DC output voltage of the first power supply 11 at a predetermined value. The second voltage feedback controller 42 is electrically connected to the output $V_o$ for providing a second control signal to control the second DC output voltage of the second power supply 12 at the predetermined value. During the period that the first power supply 11 is under an abnormal operation, the first power supply 11 keeps the first DC output voltage greater than the predetermined value. Owing to the negative feedback control, the second voltage feedback controller 42 will provide the second control signal to decrease the second DC output voltage in order to maintain the DC output voltage at the predetermined value. Thereby, the second power supply 12 will be shutdown. In the same reason, during the period that the second power supply 12 is under an abnormal operation, and the second power supply 12 keeps the second DC output voltage greater than the predetermined value, the first power supply 11 will be shutdown owing to the negative feedback control.

It is therefore attempted by the applicant to deal with the above situation encountered with the prior art.

SUMMARY OF THE INVENTION

It is therefore an object of the present invention to propose a parallel power supply system with an over-voltage protection circuit that has two bypass diodes used for forming a bypass connection which operates during the over-voltage outputting period.

According to an aspect of the present invention, the parallel power supply system with an over-voltage protection circuit for providing a stable DC output voltage includes a first power supply having a first output terminal for providing a first DC output voltage and a first ground terminal electrically connected to ground, a second power supply having a second output terminal for providing a second DC output voltage and a second ground terminal electrically connected to ground, a first diode having an anode end electrically connected to the first output terminal of the first power supply, a second diode having an anode end electrically connected to the second output terminal of the second power supply, and a cathode end electrically connected to a cathode end of the first diode for forming a node which is an output of the parallel power supply system, a first voltage feedback controller electrically connected to the first DC output voltage for providing a first control signal to control the first DC output voltage of the first power supply at a predetermined value, a second voltage feedback controller electrically connected to the second DC output voltage for providing a second control signal to control the second DC output voltage of the second power supply at the predetermined value, a first resistor having one end electrically connected to the node and the other end electrically connected to an input terminal of the first voltage feedback controller, a second resistor having one end electrically connected to the node and the other end electrically connected to an input terminal of the second voltage feedback controller, a third diode having an anode end electrically connected to the input terminal of the first voltage feedback controller and a cathode end electrically connected to the first output terminal of the first power supply, and a fourth diode having an anode end electrically connected to the input terminal of the second voltage feedback controller and a cathode end electrically connected to the second output terminal of the first power supply, wherein the first DC output voltage turns on the fourth diode for maintaining the DC output voltage of the parallel power supply system at the predetermined value when the first DC output voltage is greater than the predetermined value, and the second DC output voltage turns on the third diode for maintaining the DC output voltage of the parallel power supply system at the predetermined value when the second DC output voltage is greater than the predetermined value.

Preferably, the first power supply further includes a low pass filter having one end electrically connected to the output terminal of the first power supply for filtering the first DC output voltage, and the other end electrically connected to ground.

Preferably, the first power supply further includes a first transformer which is a main power source of the first power supply.

Preferably, the first voltage feedback controller further includes a first isolated transformer having a primary side electrically connected to an output terminal of the first voltage feedback controller for providing an isolated protection.

Preferably, the first transformer further includes a switch electrically connected to a primary side of the first transformer for controlling the first DC output voltage by the first control signal.

Alternatively, the first power supply further includes a first buck converter which is a main power source of the first power supply.

Preferably, the first buck converter further includes a switch electrically connected to the first voltage feedback controller for controlling the first DC output voltage by the first control signal.

The present invention may best be understood through the following description with reference to the accompanying drawings, in which:

DETAILED DESCRIPTION OF THE PREFERRED EMBODIMENT

Figure 1:
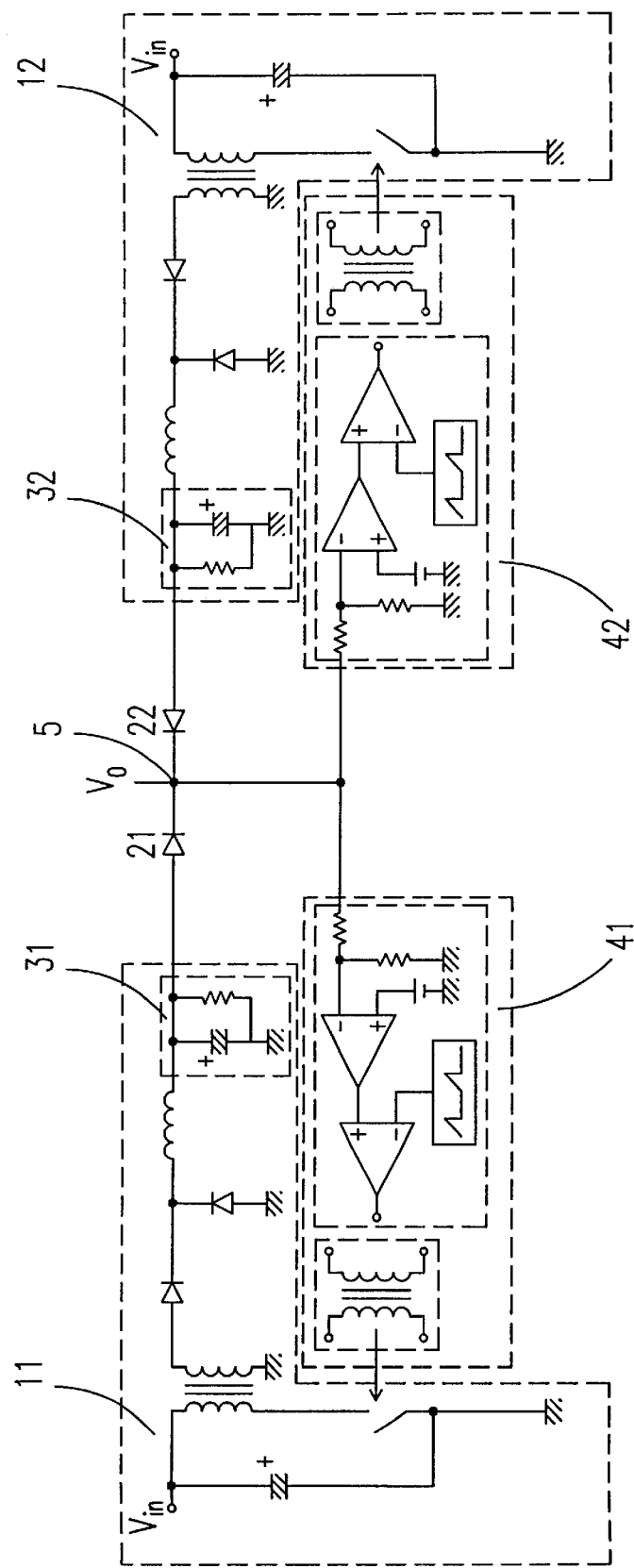
FIG. 1 illustrates a parallel power supply system according to the prior art.
Figure 2A:
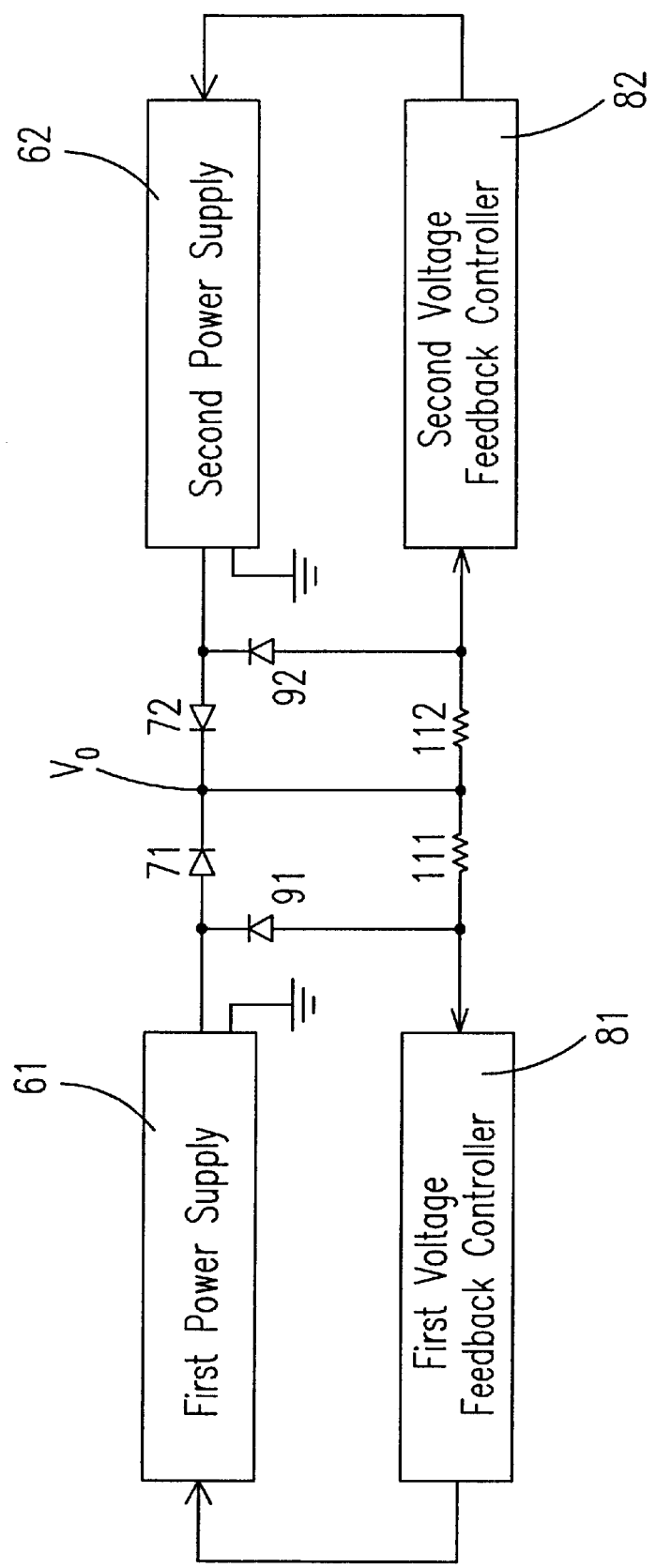
FIG. 2(a) is a block diagram illustrating a parallel power supply system with an over-voltage protection circuit according to a first preferred embodiment of the present invention.

FIG. 2(a) is a block diagram illustrating a parallel power supply system with an over-voltage protection circuit according to a first preferred embodiment of the present invention. As shown in FIG. 2(a), the parallel power supply system with an over-voltage protection circuit for providing a stable DC output voltage includes a first power supply 61, a second power supply 62, a first diode 71, a second diode 72, a first voltage feedback controller 81, a second voltage feedback controller 82, a first resistor 111, a second resistor 112, a third diode 91, and a fourth diode 92. The first power supply 61 has a first output terminal for providing a first DC output voltage and a first ground terminal electrically connected to ground. The second power supply 62 has a second output terminal for providing a second DC output voltage and a second ground terminal electrically connected to ground. The first diode 71 has an anode end electrically connected to the first output terminal of the first power supply 61. The second diode 72 has an anode end electrically connected to the second output terminal of the second power supply 62, and a cathode end electrically connected to a cathode end of the first diode 71 for forming a node which is an output $V_o$ of the parallel power supply system. The first voltage feedback controller 81 is electrically connected to the first DC output voltage for providing a first control signal to control the first DC output voltage of the first power supply 61 at a predetermined value. The second voltage feedback controller 82 is electrically connected to the second DC output voltage for providing a second control signal to control the second DC output voltage of the second power supply 62 at said predetermined value. The first resistor 111 has one end electrically connected to the node and the other end electrically connected to an input terminal of the first voltage feedback controller 81. The second resistor 112 has one end electrically connected to the node and the other end electrically connected to an input terminal of the second voltage feedback controller 82. The third diode 91 has an anode end electrically connected to the input terminal of the first voltage feedback controller 81 and a cathode end electrically connected to the first output terminal of the first power supply 61. And, the fourth diode 92 has an anode end electrically connected to the input terminal of the second voltage feedback controller 82 and a cathode end electrically connected to the second output terminal of the first power supply 61, where the first DC output voltage turns on the fourth diode 92 for maintaining the DC output voltage of the parallel power supply system at the predetermined value when the first DC output voltage is greater than the predetermined value, and the second DC output voltage turns on the third diode 91 for maintaining the DC output voltage of the parallel power supply system at the predetermined value when the second DC output voltage is greater than the predetermined value.

Figure 2B:
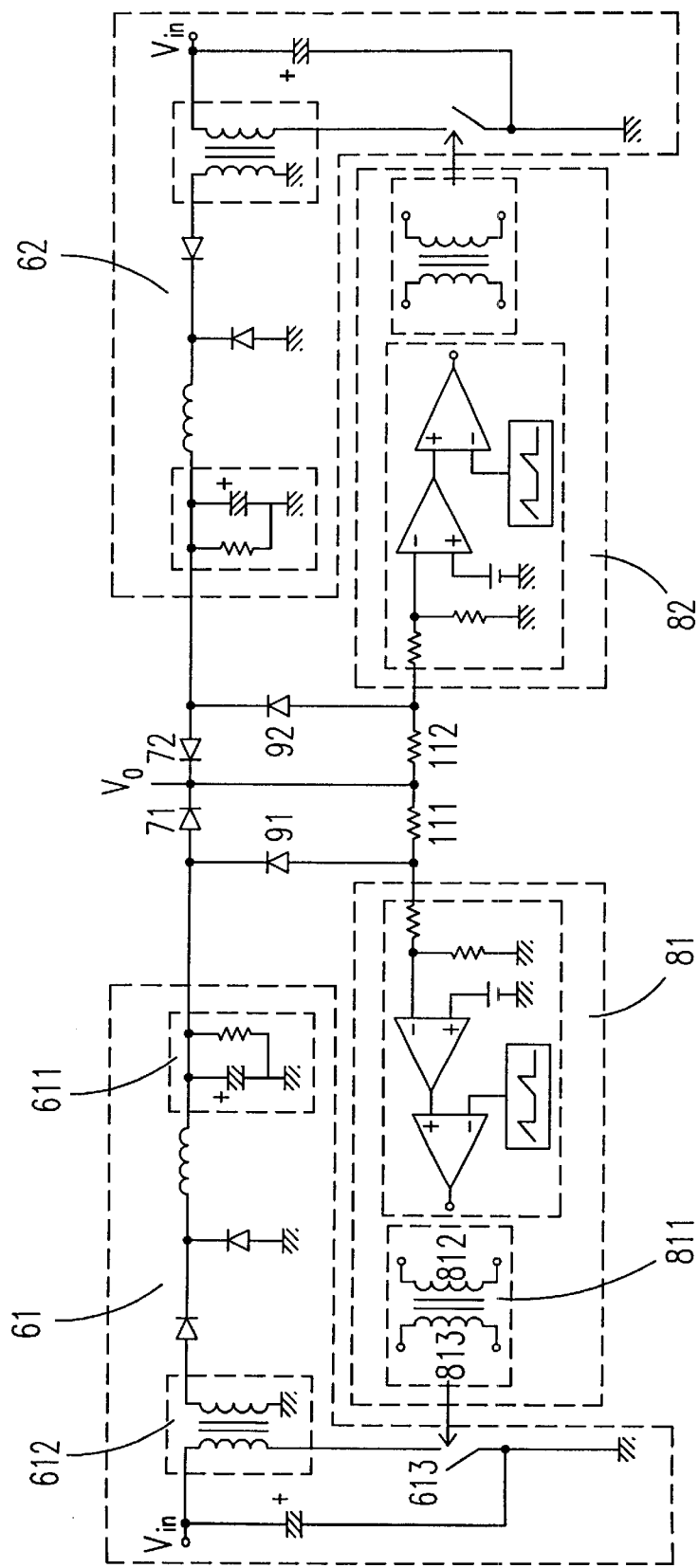
FIG. 2(b) is a schematic diagram illustrating a parallel power supply system with an over-voltage protection circuit according to a first preferred embodiment of the present invention.

FIG. 2(b) is a schematic diagram illustrating a parallel power supply system with an over-voltage protection circuit according to a first preferred embodiment of the present invention. As shown in FIG. 2(b), the first power supply 61 includes a low pass filter 611 having one end electrically connected to the output terminal of the first power supply 61 for filtering the first DC output voltage, and the other end electrically connected to ground. The first power supply 61 further includes a first transformer 612 which is a main power source of the first power supply 61. Meanwhile, the first voltage feedback controller 81 further includes a first isolated transformer 811 having a primary side 812 electrically connected to an output terminal of the first voltage feedback controller 81 for providing an isolated protection. The first transformer 612 further includes a switch 613 electrically connected to a primary side of the first transformer 612 for controlling the first DC output voltage by the first control signal, and electrically connected to a secondary side 813 of the isolated first transformer 811 for switching the switch 613. Also, the second power supply 62 has the same elements like the first power supply 61.

Figure 2C:
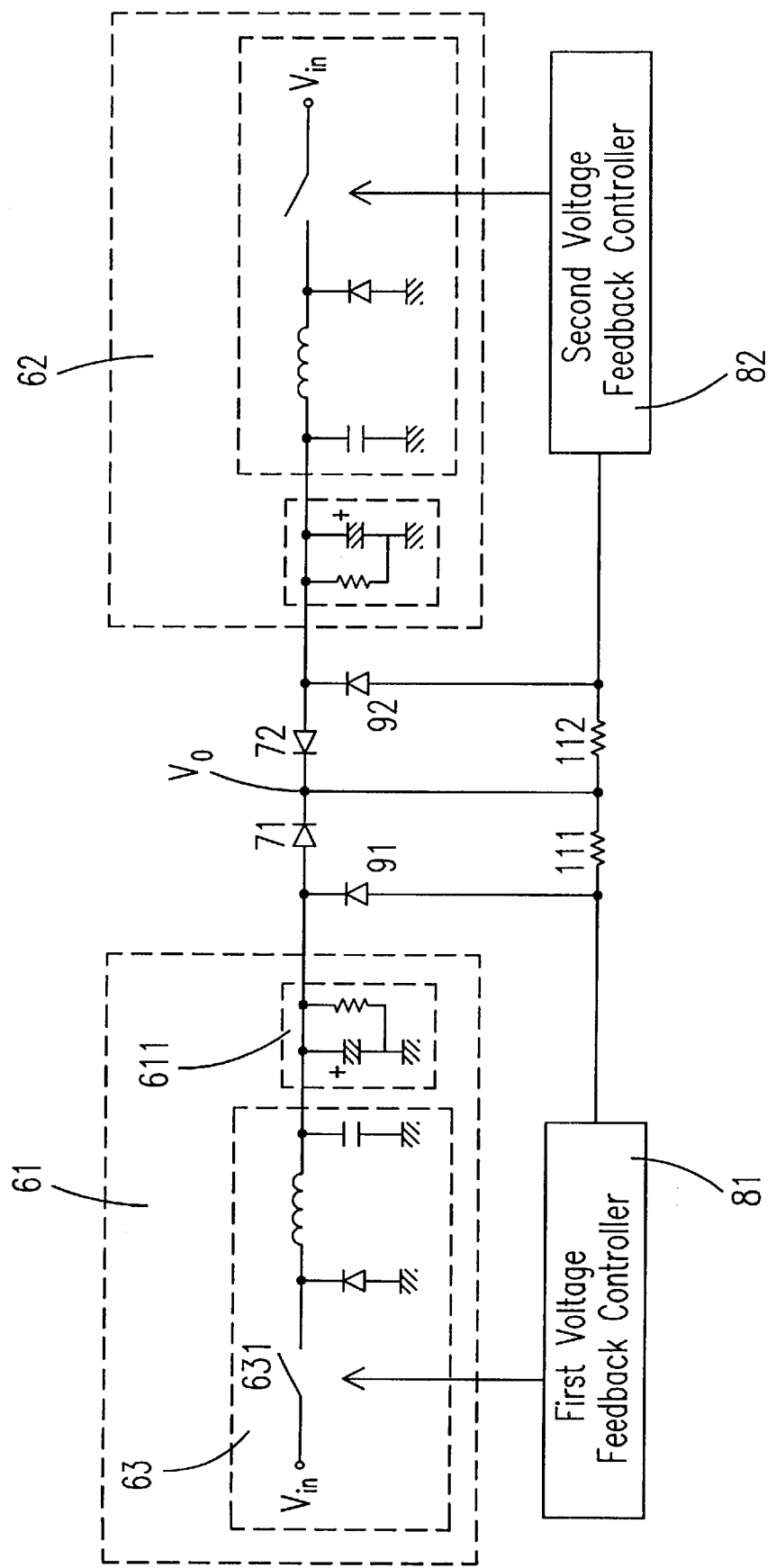
FIG. 2(c) is a schematic diagram illustrating a parallel power supply system with an over-voltage protection circuit according to a second preferred embodiment of the present invention.

FIG. 2(c) is a schematic diagram illustrating a parallel power supply system with an over-voltage protection circuit according to a second preferred embodiment of the present invention. As shown in FIG. 2(c), the first power supply 61 further includes a first buck converter 63 which is a main power source of the first power supply 61. The first buck converter 63 further includes a switch 631 electrically connected to the first voltage feedback controller 81 for controlling the first DC output voltage by the first control signal.

Owing to the above descriptions, the parallel power supply system with an over-voltage protection circuit that has two bypass diodes used for forming a bypass connection to avoid over-voltage outputs.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A parallel power supply system with an over-voltage protection circuit for providing a stable DC output voltage, comprising:

a first power supply having a first output terminal for providing a first DC output voltage and a first ground terminal electrically connected to ground;

a second power supply having a second output terminal for providing a second DC output voltage and a second ground terminal electrically connected to ground;

a first diode having an anode end electrically connected to said first output terminal of said first power supply;

a second diode having an anode end electrically connected to said second output terminal of said second power supply, and a cathode end electrically connected to a cathode end of said first diode for forming a node which is an output of said parallel power supply system;

a first voltage feedback controller electrically connected to said first DC output voltage for providing a first control signal to control said first DC output voltage of said first power supply at a predetermined value;

a second voltage feedback controller electrically connected to said second DC output voltage for providing a second control signal to control said second DC output voltage of said second power supply at said predetermined value;

a first resistor having one end electrically connected to said node and the other end electrically connected to an input terminal of said first voltage feedback controller;

a second resistor having one end electrically connected to said node and the other end electrically connected to an input terminal of said second voltage feedback controller;

a third diode having an anode end electrically connected to said input terminal of said first voltage feedback controller and a cathode end electrically connected to said first output terminal of said first power supply; and a fourth diode having an anode end electrically connected to said input terminal of said second voltage feedback controller and a cathode end electrically connected to said second output terminal of said first power supply, wherein said first DC output voltage turns on said fourth diode for maintaining said DC output voltage of said parallel power supply system at said predetermined value when said first DC output voltage is greater than said predetermined value, and said second DC output voltage turns on said third diode for maintaining said DC output voltage of said parallel power supply system at said predetermined value when said second DC output voltage is greater than said predetermined value.

2. The parallel power supply system according to claim 1, wherein said first power supply further comprises a low pass filter having one end electrically connected to said output terminal of said first power supply for filtering said first DC output voltage, and the other end electrically connected to ground.

3. The parallel power supply system according to claim 1, wherein said first power supply further comprises a first transformer which is a main power source of said first power supply.

4. The parallel power supply system according to claim 3, wherein said first voltage feedback controller further comprises a first isolated transformer having a primary side electrically connected to an output terminal of said first voltage feedback controller for providing an isolated protection.

5. The parallel power supply system according to claim 4, wherein said first transformer further comprises a switch electrically connected to a primary side of said first transformer for controlling said first DC output voltage by said first control signal, and electrically connected to a secondary side of said first isolated transformer for switching said switch.

6. The parallel power supply system according to claim 1, wherein said first power supply further comprises a first buck converter which is a main power source of said first power supply.

7. The parallel power supply system according to claim 6, wherein said first buck converter further comprises a switch electrically connected to said first voltage feedback controller for controlling said first DC output voltage by said first control signal.

\* \* \* \* \*